(12) United States Patent
Yoon et al.

(10) Patent No.: US 11,498,027 B2
(45) Date of Patent: Nov. 15, 2022

(54) DEHUMIDIFIER

(71) Applicant: LG ELECTRONICS INC., Seoul (KR)

(72) Inventors: Sangjun Yoon, Seoul (KR); Changhoon Kim, Seoul (KR); Dongmin Park, Seoul (KR); Sangyoun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 16/549,112

(22) Filed: Aug. 23, 2019

(65) Prior Publication Data

US 2020/0061532 A1 Feb. 27, 2020

(30) Foreign Application Priority Data

Aug. 23, 2018 (KR) .......................... 10-2018-0098556

(51) Int. Cl.
*F24F 13/22* (2006.01)
*B01D 53/26* (2006.01)
*F24F 1/0083* (2019.01)

(52) U.S. Cl.
CPC .......... *B01D 53/265* (2013.01); *F24F 1/0083* (2019.02); *F24F 13/222* (2013.01); *F24F 2013/227* (2013.01)

(58) Field of Classification Search
CPC .... F24F 13/222; F24F 2013/227; F25D 21/14
(Continued)

(56) References Cited

U.S. PATENT DOCUMENTS

| 7,284,388 B2 * | 10/2007 | Yoshida ................ F28F 17/005 62/285 |
| 7,523,854 B2 * | 4/2009 | Gray ..................... F24F 13/222 220/571 |
| 7,856,840 B2 * | 12/2010 | Yoon ..................... F24F 3/1423 62/285 |

(Continued)

FOREIGN PATENT DOCUMENTS

| CN | 1782564 | 6/2006 |
| CN | 101737928 | 6/2010 |

(Continued)

OTHER PUBLICATIONS

Lu Jun, "Movable dehumidifier with multipurpose integrated water drainage structure", May 31, 2017, eSpacenet, CN 106766082, all description (Year: 2017).*

(Continued)

*Primary Examiner* — Filip Zec
(74) *Attorney, Agent, or Firm* — Ked & Associates

(57) ABSTRACT

A dehumidifier is provided that may include a bucket; a drain pan comprising a drain passage configured to guide condensed water dropped from an evaporator to the bucket; a pump; a barrier configured to define a bucket space in which the bucket is accommodated; and a pump water inlet line and a pump water outlet line, which are connected to the pump. The pump water inlet line may include a flexible tube a portion of which is inserted into the bucket. The bucket may have an opening into which a portion of the flexible tube may be inserted. A portion of the flexible tube may be bent to be easily inserted into the bucket through the opening of the bucket.

12 Claims, 17 Drawing Sheets

(58) Field of Classification Search
USPC .................................................. 62/285–291
See application file for complete search history.

(56) References Cited

U.S. PATENT DOCUMENTS

| | | | | |
|---|---|---|---|---|
| 8,882,604 | B2* | 11/2014 | Lochtefeld | A63G 31/007 |
| | | | | 472/117 |
| 9,470,424 | B2* | 10/2016 | Iwazaki | F24F 1/06 |
| 2002/0134099 | A1* | 9/2002 | Mochizuki | F24F 1/50 |
| | | | | 62/285 |
| 2009/0064698 | A1* | 3/2009 | Spanger | F24F 13/222 |
| | | | | 62/280 |
| 2009/0071181 | A1* | 3/2009 | Spanger | F24F 13/222 |
| | | | | 62/262 |
| 2011/0048039 | A1* | 3/2011 | Kohavi | B60H 1/00414 |
| | | | | 62/93 |
| 2014/0202191 | A1 | 7/2014 | Jinnai et al. | |
| 2014/0216093 | A1 | 8/2014 | Kaiser et al. | |
| 2014/0219799 | A1* | 8/2014 | Selsam | F03D 1/0666 |
| | | | | 416/11 |
| 2015/0184875 | A1* | 7/2015 | Lee | F24F 13/222 |
| | | | | 62/93 |
| 2015/0276241 | A1* | 10/2015 | Jeon | G01F 23/74 |
| | | | | 62/126 |
| 2015/0276242 | A1* | 10/2015 | Yoon | F24F 1/0323 |
| | | | | 62/291 |
| 2017/0045286 | A1 | 2/2017 | Ungor et al. | |
| 2018/0195758 | A1 | 7/2018 | Hou et al. | |

FOREIGN PATENT DOCUMENTS

| | | |
|---|---|---|
| CN | 201637000 | 11/2010 |
| CN | 201811404 | 4/2011 |
| CN | 103574789 | 2/2014 |
| CN | 104949214 | 9/2015 |
| CN | 106440311 | 2/2017 |
| CN | 106482317 | 3/2017 |
| CN | 106766082 | 5/2017 |
| CN | 206398959 | 8/2017 |
| CN | 206846915 | 1/2018 |
| KR | 10-2005-0088607 | 9/2005 |
| KR | 10-2011-0031934 | 3/2011 |
| KR | 10-2014-0046311 | 4/2014 |
| KR | 10-1400710 | 5/2014 |
| KR | 10-2016-0013477 | 2/2016 |

OTHER PUBLICATIONS

U.S. Office Action issued in U.S. Appl. No. 16/548,930 dated Jul. 9, 2021.
Chinese Office Action dated Oct. 9, 2020.
Korean Office Action dated Jul. 1, 2019.
U.S. Appl. No. 16/548,930, filed Aug. 23, 2019.
U.S. Appl. No. 16/549,112, filed Aug. 23, 2019.
Chinese Office Action dated Dec. 3, 2020.

* cited by examiner

DEHUMIDIFIER

CROSS-REFERENCE TO RELATED APPLICATION(S)

The present application claims priority under 35 U.S.C. 119 and 35 U.S.C. 365 to Korean Patent Application No. 10-2018-0098556, filed in Korea on Aug. 23, 2018, which is hereby incorporated by reference in its entirety.

BACKGROUND

1. Field

A dehumidifier, and more particularly, a dehumidifier including a bucket in which condensed water condensed in an evaporator is contained is disclosed herein.

2. Background

Dehumidifiers are air conditioners used to reduce humidity. Such a dehumidifier may dehumidify an indoor space using a refrigeration cycle device including a compressor, a condenser, an expansion mechanism, and an evaporator. The dehumidifier may include a drain pan that receives condensed water dropped from the evaporator and a bucket in which the condensed water dropped from the drain pan is contained. When a large amount of condensed water is collected in the bucket, a user may withdraw the bucket from the dehumidifier to discard the condensed water and then may remount the bucket in the dehumidifier.

In the dehumidifier, a separate water outlet line may be connected to the drain pan, and a drain pump may be mounted on the water outlet line to drain the condensed water through the water outlet line when the drain pump is driven. One example of the dehumidifier is disclosed in Korean Patent Registration No. 10-1400710 B1, published on May 27, 2014, which is hereby incorporated by reference. In the dehumidifier disclosed in Korean Patent Registration No. 10-1400710 B1, a discharge conduit through which water is discharged in a free falling manner may be connected to a reservoir, a branch conduit may be connected to the discharge conduit, a drain pump that forcibly discharges the water to the branch conduit may be provided, and an extension conduit may be connected to the branch conduit. The user may select an operation of drain using a storage tank or automatic drain using the drain pump.

However, in the dehumidifier provided with the branch conduit and the drain pump in the discharge conduit, the condensed water may leak from a connection portion between the discharge conduit and the branch conduit. Also, the condensed water may leak from a connection portion between the branch conduit and the extension conduit. As a result, the leaking condensed water may contaminate an inside of the dehumidifier or a periphery of the dehumidifier.

Also, as the discharge conduit is connected to a lower portion of the reservoir, if the discharge conduit or the extension conduit is not used, the discharge conduit or the extension conduit must be blocked with a separate plug, and as a check valve must be installed in the discharge conduit, a number of parts or components may increase. When the user loses the plug, there is a disadvantage that the dehumidifier is not usable.

BRIEF DESCRIPTION OF THE DRAWINGS

Embodiments will be described in detail with reference to the following drawings in which like reference numerals refer to like elements, and wherein.

DETAILED DESCRIPTION

Figure 1:
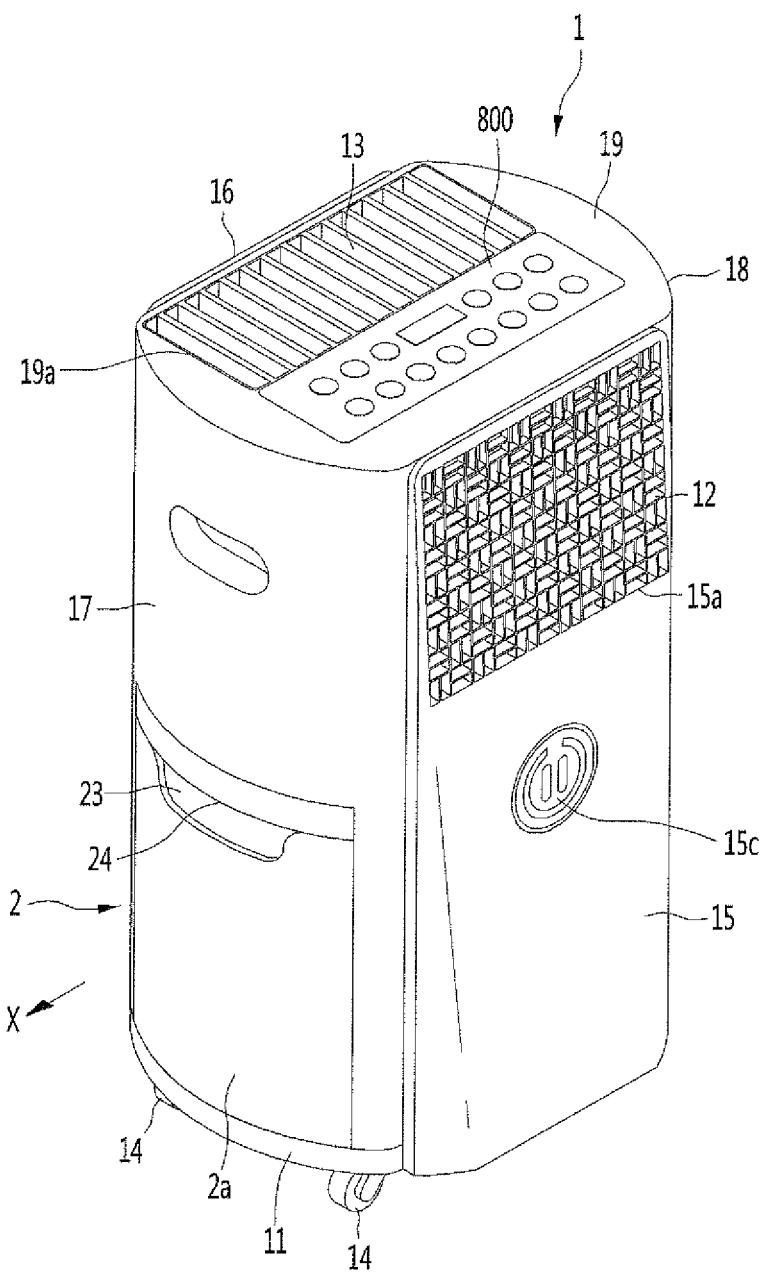
FIG. 1 is a perspective view of a dehumidifier according to an embodiment.

Hereinafter, embodiments will be described with reference to the accompanying drawings. Wherever possible, the same or like reference numerals have been used to indicate the same or like elements, and repetitive disclosure has been omitted.

Figure 2:
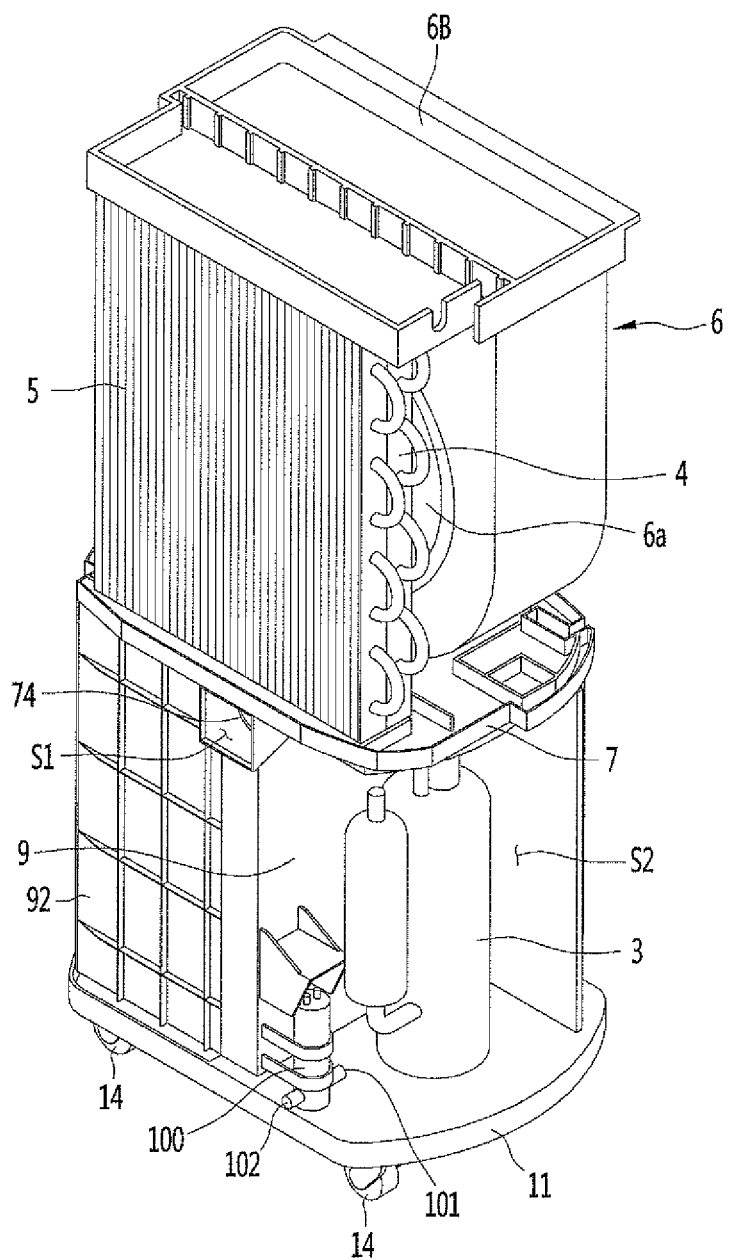
FIG. 2 is a perspective view illustrating an inside of the dehumidifier according to an embodiment.
Figure 3:
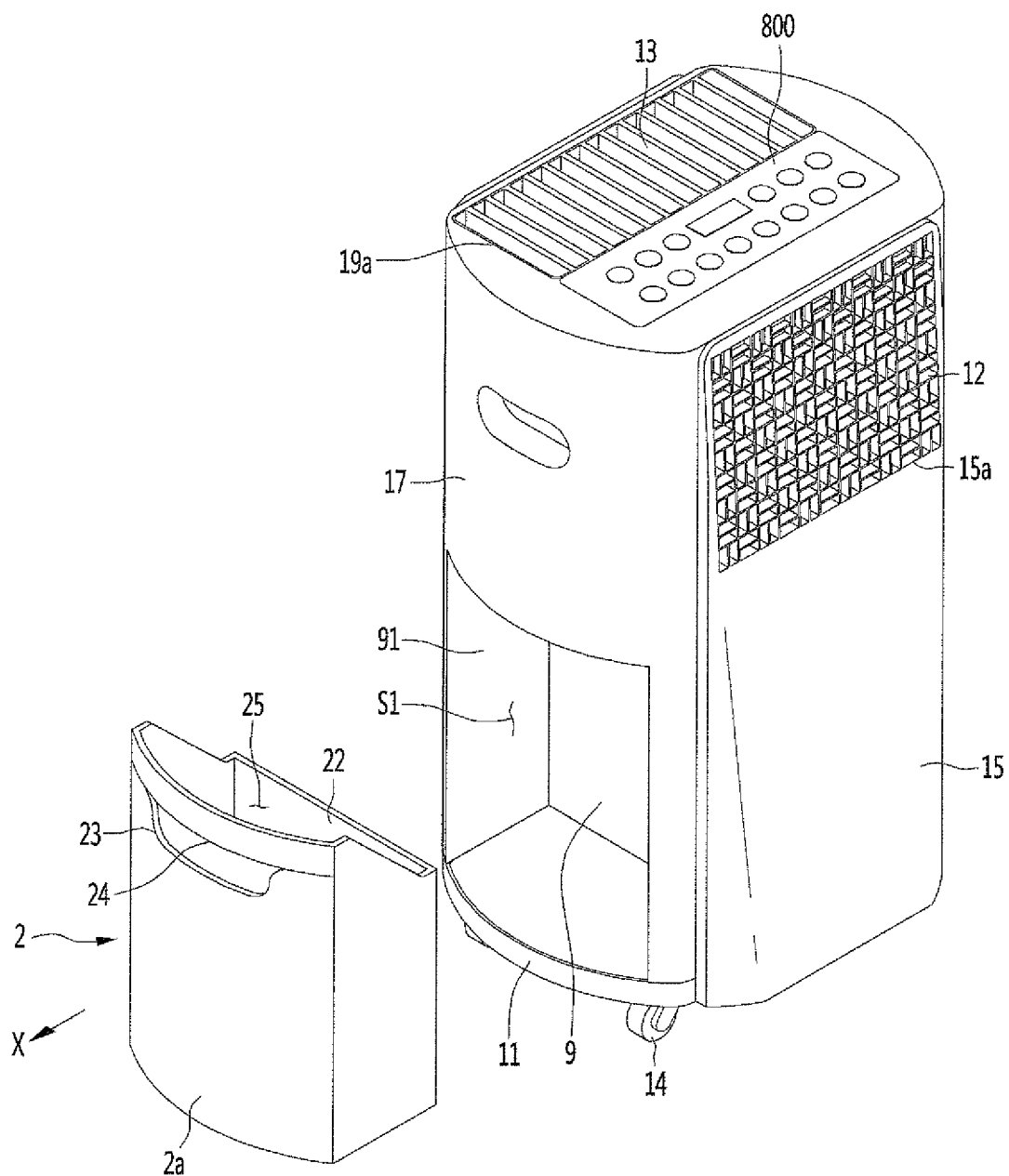
FIG. 3 is a perspective view showing a bucket of FIG. 1 withdrawn to an outside of the dehumidifier.
Figure 4:
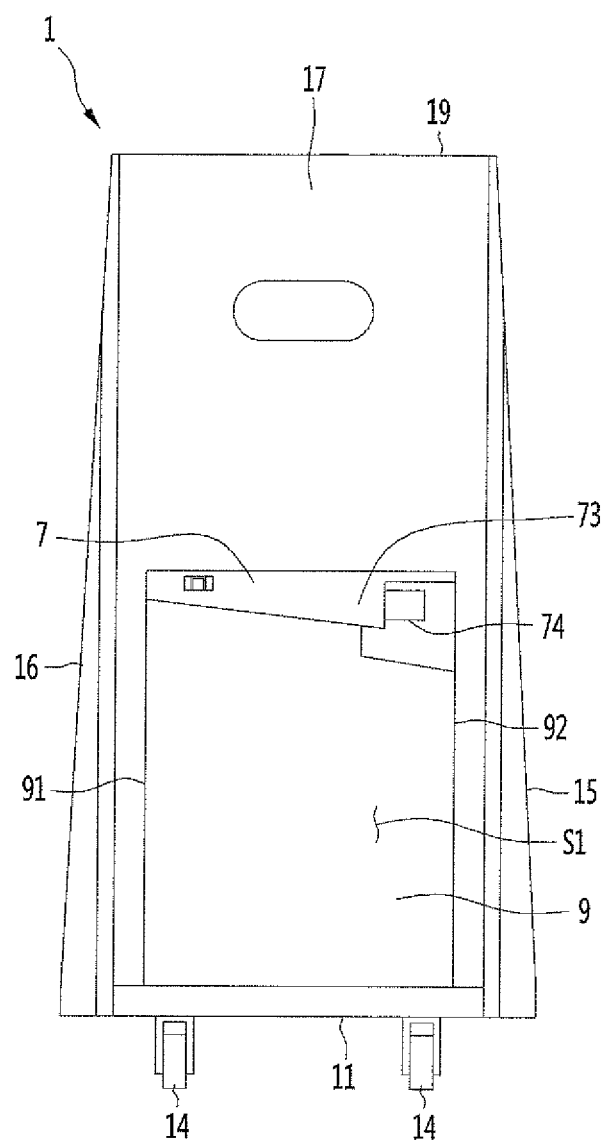
FIG. 4 is a side view showing the bucket of FIG. 1 withdrawn to the outside of the dehumidifier.
Figure 5:
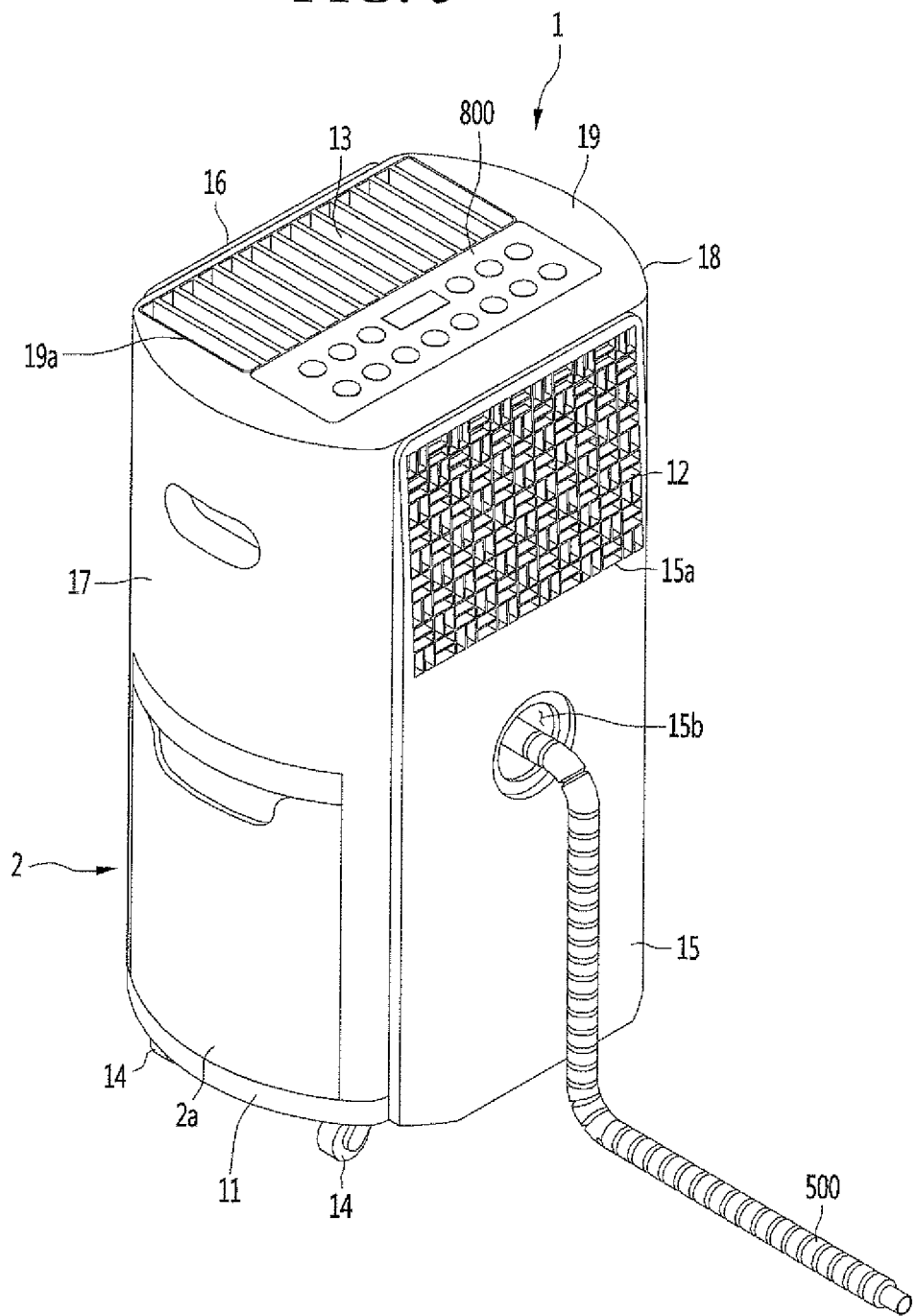
FIG. 5 is a perspective view showing the dehumidifier of FIG. 1 connected to a drain hose.
Figure 6:
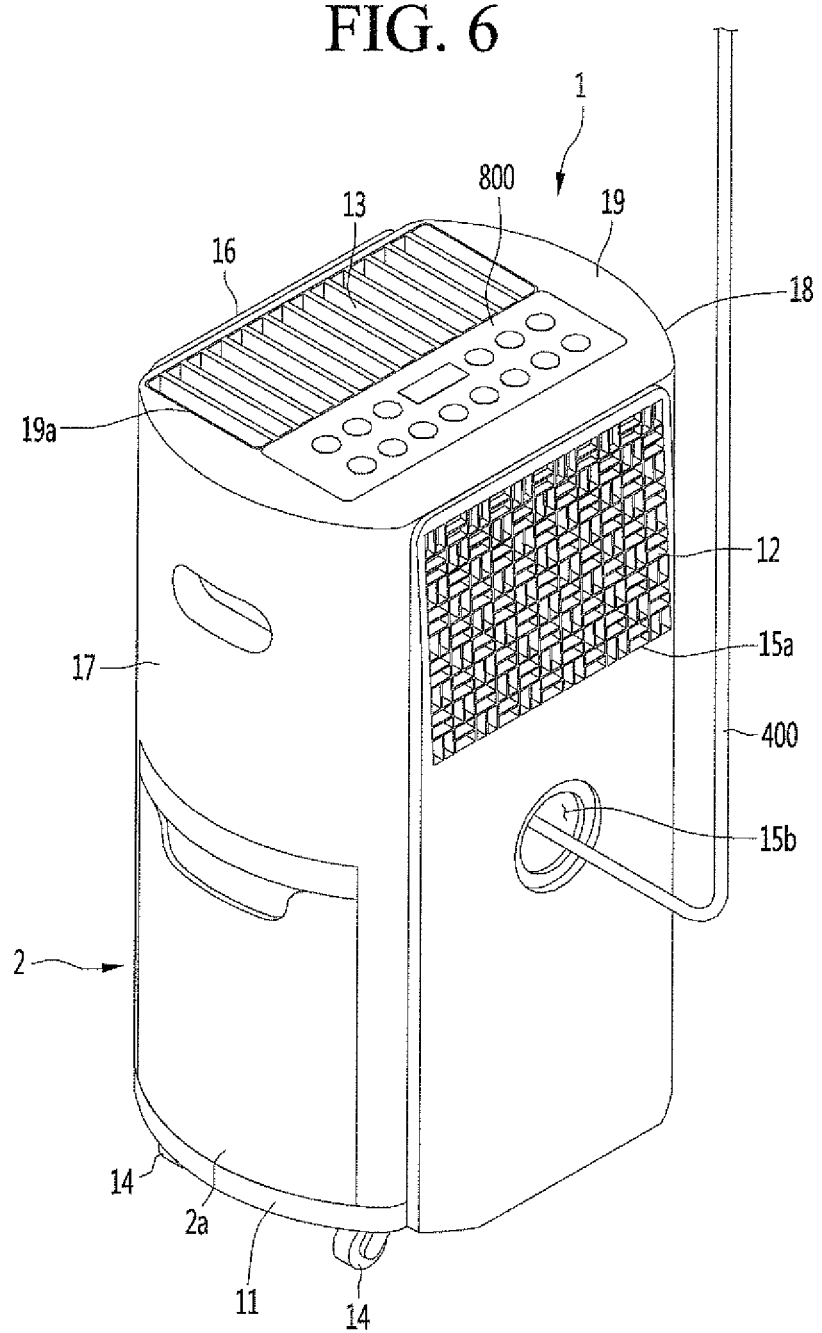
FIG. 6 is a perspective view showing an outer tube connected to the dehumidifier of FIG. 1.

FIG. 1 is a perspective view of a dehumidifier according to an embodiment. FIG. 2 is a perspective view illustrating an inside of the dehumidifier according to an embodiment. FIG. 3 is a perspective view showing a bucket of FIG. 1 withdrawn to an outside of the dehumidifier. FIG. 4 is a side view showing the bucket of FIG. 1 withdrawn to the outside of the dehumidifier. FIG. 5 is a perspective view showing the dehumidifier of FIG. 1 connected to a drain hose. FIG. 6 is a perspective view showing an outer tube connected to the dehumidifier of FIG. 1.

A dehumidifier may include a casing 1 defining an outer appearance thereof, and a bucket 2 separably mounted in the casing 1. The casing 1 may be provided as an assembly of a plurality of members. The casing 1 may include a base 11, a suction inlet 12 having a suction hole through which air is suctioned, and a discharge outlet 13 through which air dehumidified in the dehumidifier is discharged to the outside.

A wheel 14 may be installed under the base 11. The bucket 2 may be seated on the base 11. A top surface of the base 11 may be a bucket seat surface on which the bucket 2 is seated.

The casing 1 may include a back cover 15 defining an outer appearance of a rear surface of the dehumidifier, a front cover 16 defining an outer appearance of a front surface of the dehumidifier, a pair of side covers 17 and 18 defining an outer appearance of each of side surfaces of the dehumidifier, and a top cover 19 defining an outer appearance of a top surface of the dehumidifier. The suction inlet 12 may be disposed on the back cover 15, and a rear opening 15a in which the suction inlet 12 is disposed may be defined in the back cover 15.

The discharge outlet 13 may be disposed on the top cover 19. A top opening 19a in which the discharge outlet 13 is disposed may be defined in the top cover 19. The dehumidifier may suction air through the rear surface to dehumidify the inside thereof and then discharge the air through the top surface.

An outer through-hole 15b (see FIGS. 5 and 6) through which a drain hose 500 (see FIG. 5) or an outer tube 400 (see FIG. 6) passes may be defined in the casing 1. The casing 1 may include a cap 15c (see FIG. 1) disposed in the outer through-hole 15b. When the outer tube 400 or the drain hose 500 is connected to the dehumidifier, the cap 15c may be separated from the casing 1, and the user may insert the outer tube 400 or the drain hose 500 into the outer through-hole 15b to connect the outer tube 400 or the drain hose 500 to the dehumidifier.

A control panel 800 through which the user is capable of manipulating the dehumidifier may be disposed on the dehumidifier. The control panel 800 may be disposed on the top cover 19.

The bucket 2 may be inserted between the base 11 and a drain pan 7 so as to be mounted. When completely inserted, one surface 2a may define an outer appearance of the dehumidifier.

The bucket 2 may be inserted between the base 1 and a drain pan 7 from one side of the dehumidifier and be withdrawn from the one side of the dehumidifier. The bucket 2 may be a bucket which is detached from the dehumidifier in a lateral direction X.

When the bucket 2 is fully filled with condensed water, the user may empty the bucket 2 after withdrawing the bucket 2 from the casing 1, as illustrated in FIG. 2, and may reinsert the bucket 2 into the casing 1 so as to be mounted, as illustrated in FIG. 1.

The bucket 2 may be inserted to be accommodated in a bucket space S1 when mounted. The bucket 2 may have a shape a front surface, a rear surface, a left or first side surface, a right or second side surface, and a bottom surface of which are blocked. The bucket 2 may include a barrier facing plate 22 that faces one surface of a barrier 9.

A handle body 23 may be disposed at a side opposite to the barrier facing plate 22. The handle body 23 may be exposed to the outside of the dehumidifier, and a handle 24 may protrude from or be recessed into a surface exposed to the outside of the dehumidifier.

An opening 25 into which a portion of a pump water inlet line 200 may be inserted may be defined in an upper portion of the bucket 2. An entire top surface of the bucket 2 may be open to form the opening 25. Alternatively, a portion of the top surface may be blocked, and a portion of the top surface, which is not blocked, may be provided as the opening 25.

As illustrated in FIG. 5, the user may connect the drain hose 500 to the dehumidifier. The condensed water generated during dehumidification may be drained to a location close to the dehumidifier through the drain pan 7 and the drain hose 500.

The drain hose 500 may be inserted inside or outside of a drain conduit 74 of the drain pan 7 so as to be connected to the drain conduit 74 of the drain pan 7. The condensed water guided to the drain pan 7 may not be drained from the drain conduit 74 into the bucket 2, but rather, may be drained from the drain conduit 74 to outside of the dehumidifier through the drain hose 500.

As illustrated in FIG. 6, the user may connect the outer tube 400 to the dehumidifier. The condensed water contained in the bucket 2 may sequentially pass through the pump water inlet line 200, a pump 100, and a pump water outlet line 300 and then be guided to the outer tube 400. Thus, the condensed water may be forcibly drained to a location which is at a distance from the dehumidifier through the outer tube 400. In this case, the outer tube 400 may have a length greater than a length of the drain hose 500 and have an inner diameter less than an inner diameter of the drain hose 500 so that the condensed water may be guided to a distance farther than that of the drain hose 500.

As illustrated in FIG. 3, the user may withdraw the bucket 2 to drain the condensed water within the bucket 2. Or, the user may connect the drain hose 500 to the dehumidifier so that the condensed water of the drain pan 7 may be naturally drained a short distance through the drain hose 500, as illustrated in FIG. 5. Or, the outer tube 400 may be connected to the dehumidifier so that the condensed water within the bucket 2 may be forcibly drained a farther distance through the outer tube 400, as illustrated in FIG. 6. The user may select one of the above-described drain methods according to a use environment of the dehumidifier, thereby improving user convenience of the dehumidifier.

The dehumidifier may include a compressor 3, a condenser 4, an evaporator 5, and an air blower 6, which are disposed inside the casing 1. The dehumidifier may include the drain pan 7 into which the condensed water dropped from the evaporator 5 is drained and the bucket 2 in which the condensed water drained from the drain pan 7 is contained. Also, the dehumidifier may include the barrier 9 that partitions the inside of the dehumidifier into the bucket space S1 in which the bucket 2 may be accommodated and a machine room S2 in which at least one of the compressor 3 or the pump 100 may be disposed.

The compressor 3 may compress a refrigerant and be disposed in the machine room S2. The compressor 3 may be disposed on a top surface of the base 11.

The condenser 4 may be disposed between the evaporator 5 and the air blower 6 in an air flow direction. The condenser 4 may be disposed above the drain pan 7 to face the evaporator 5. In the condenser 4, the refrigerant compressed in the compressor 3 may be heat-exchanged with air passing through the evaporator 5 so as to be condensed.

In the evaporator 5, the refrigerant expanded by an expansion mechanism may be evaporated while being heat-exchanged with air. The evaporator 5 may be disposed behind or downstream of the condenser 4 in the air flow direction. The evaporator 5 may be disposed above the drain pan 7.

The air blower 6 may allow external air to sequentially pass through the evaporator 5 and the condenser 4 so as to be discharged outside of the dehumidifier and be disposed in front of the condenser 4 in the air flow direction. The air blower 6 may be disposed above the drain pan 7. The air blower 6 may have a suction hole 6a into which the air may be suctioned in a surface thereof facing the condenser 4 and a discharge hole 6b, from which the air is discharged, in a top surface thereof.

The drain pan 7 may be horizontally disposed within the dehumidifier, and the bucket space S1 and the machine room S2 may be defined below the drain pan 7. The condenser 4, the evaporator 5, and the air blower 6 may be disposed above the drain pan 7, as illustrated in FIG. 2.

The barrier 9 may be disposed below the drain pan 7 to support the drain pan 7. A lower end of the barrier 9 may be placed on the base 11 and partition a space between the base 11 and the drain pan 7 into the bucket space S1 in which the bucket 2 may be accommodated and the machine room S2 in which the pump 100 and the compressor 3 may be disposed.

Figure 7:
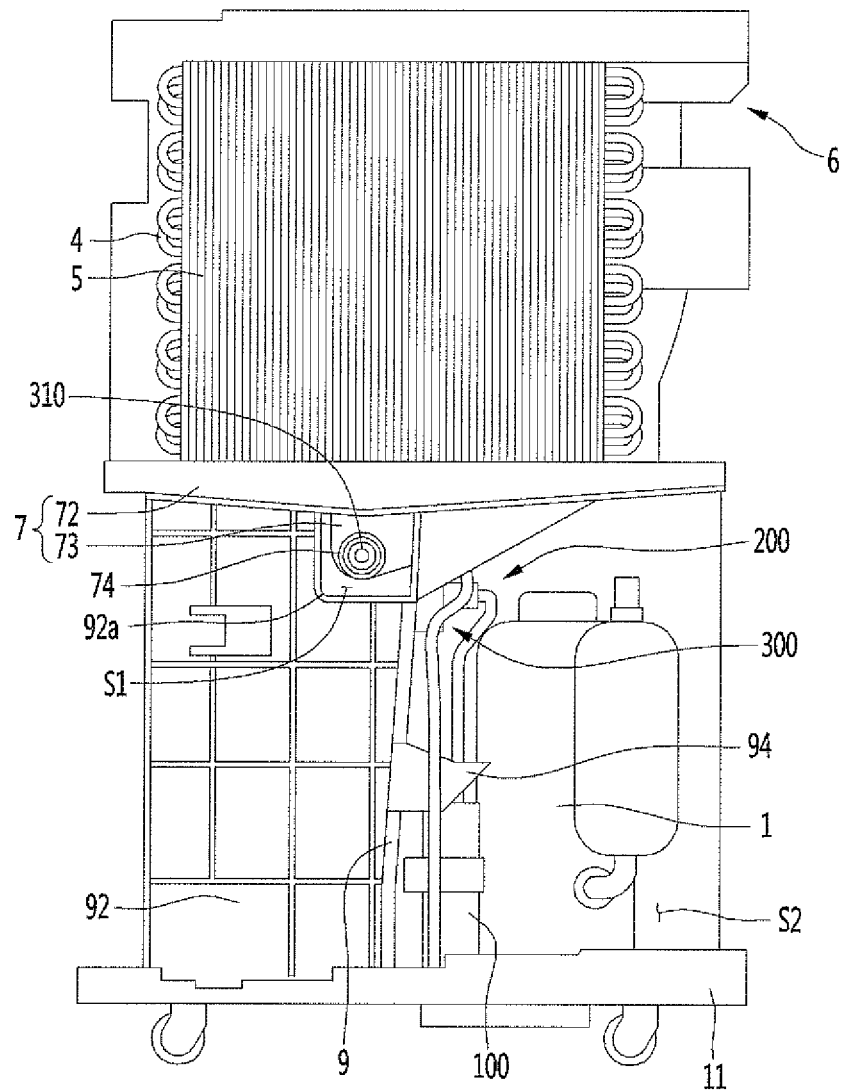
FIG. 7 is a rear view illustrating the inside of the dehumidifier according to an embodiment.
Figure 8:
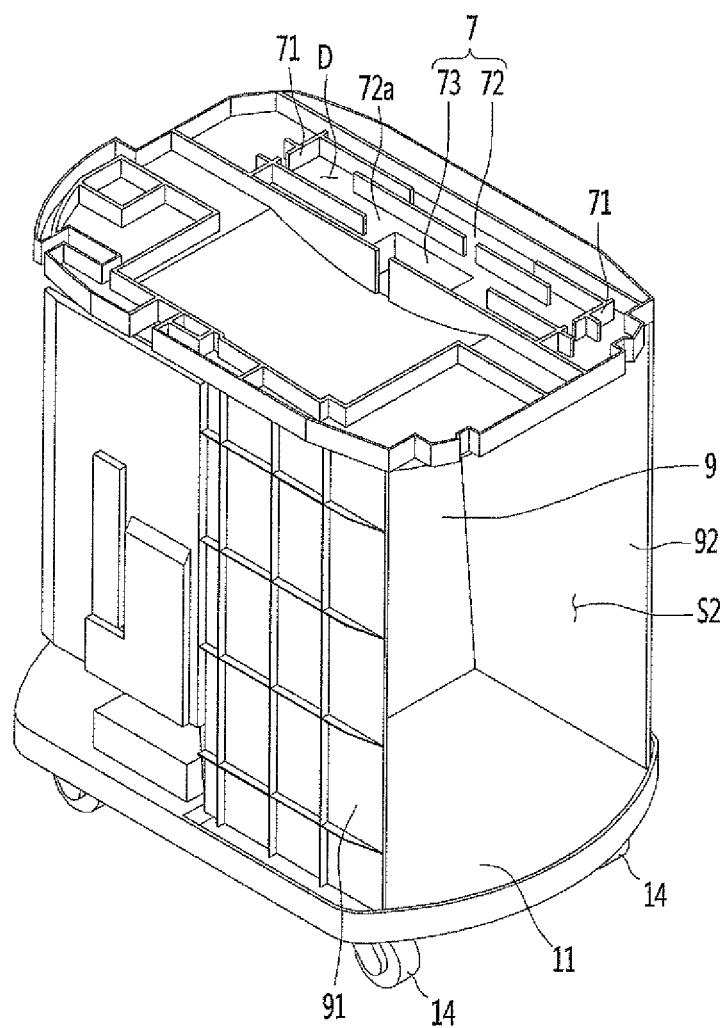
FIG. 8 is a perspective view of a drain pan, a barrier, and a base according to an embodiment.
Figure 9:
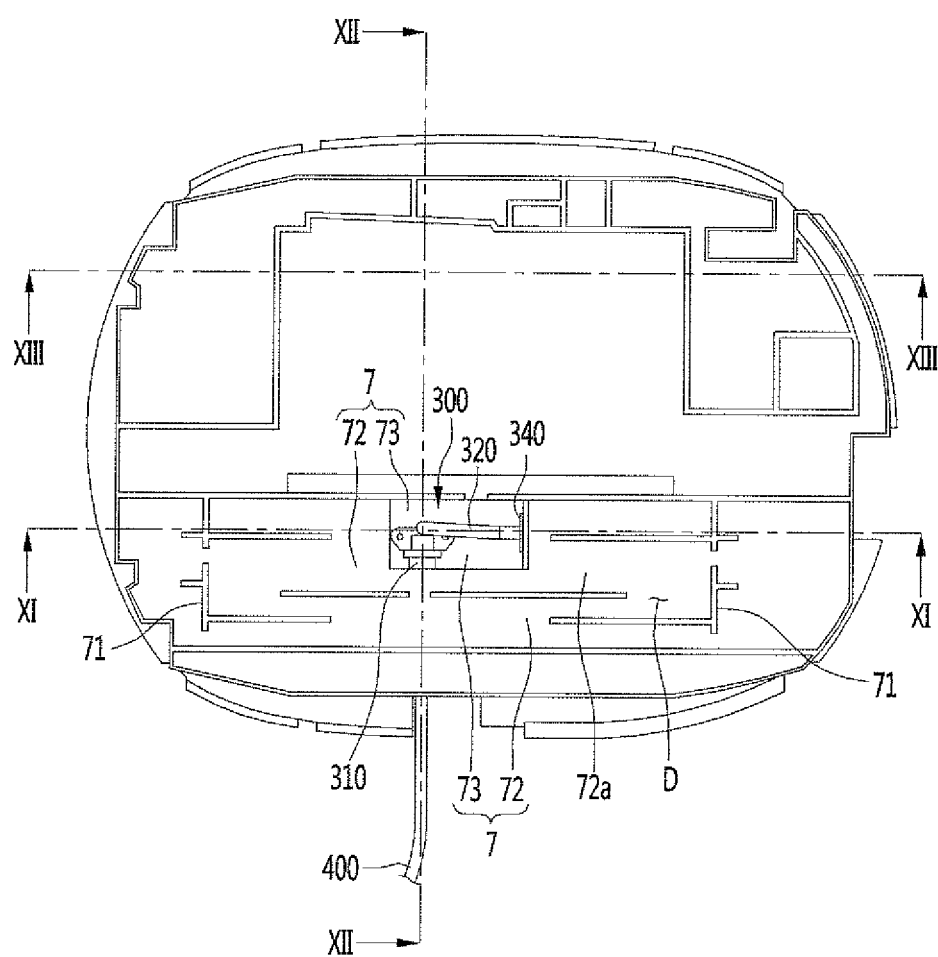
FIG. 9 is a plan view of the drain pan according to an embodiment.
Figure 10:
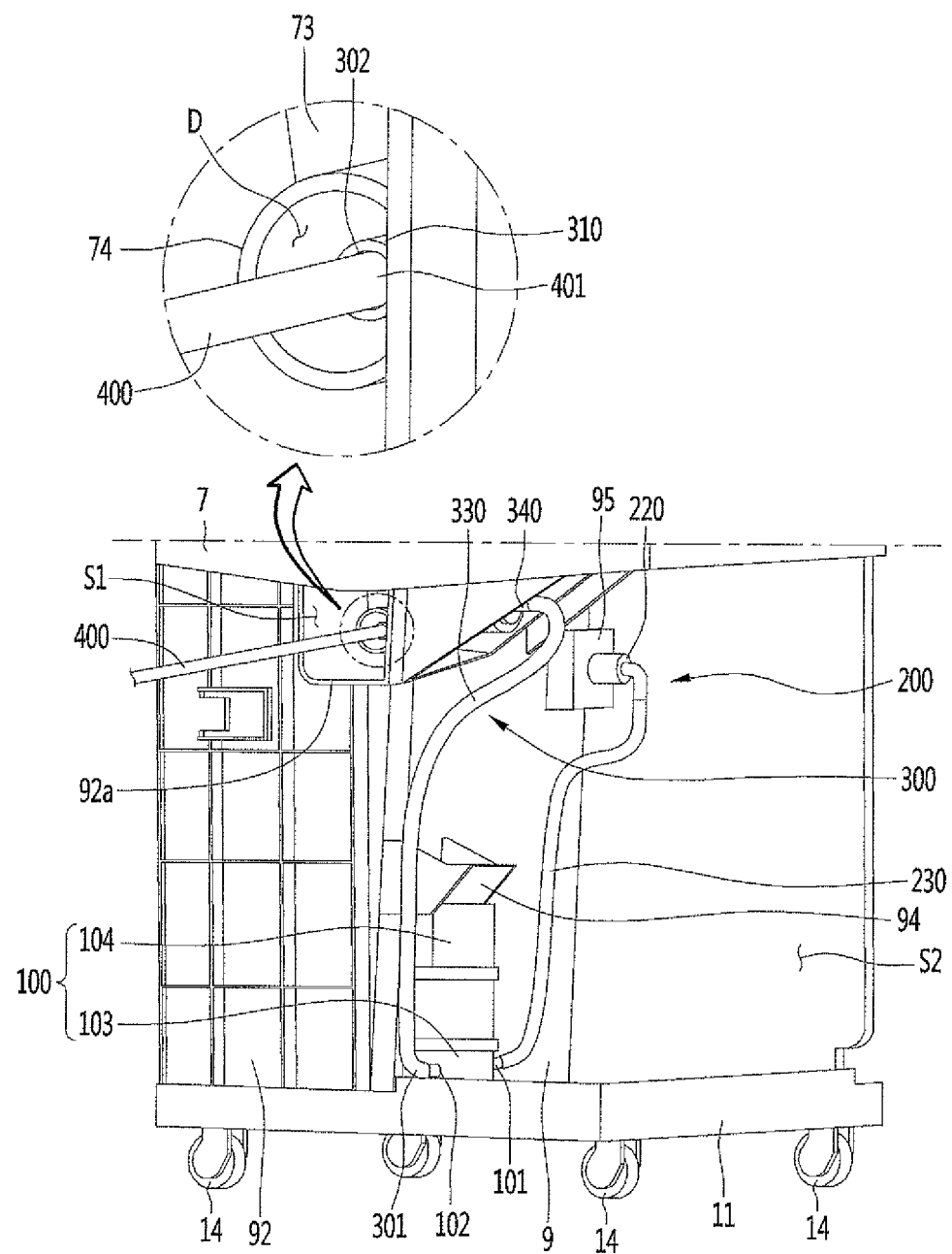
FIG. 10 is a perspective view of a pump water inlet line, a pump, a pump water outlet line, and the outer tube according to an embodiment.
Figure 11:
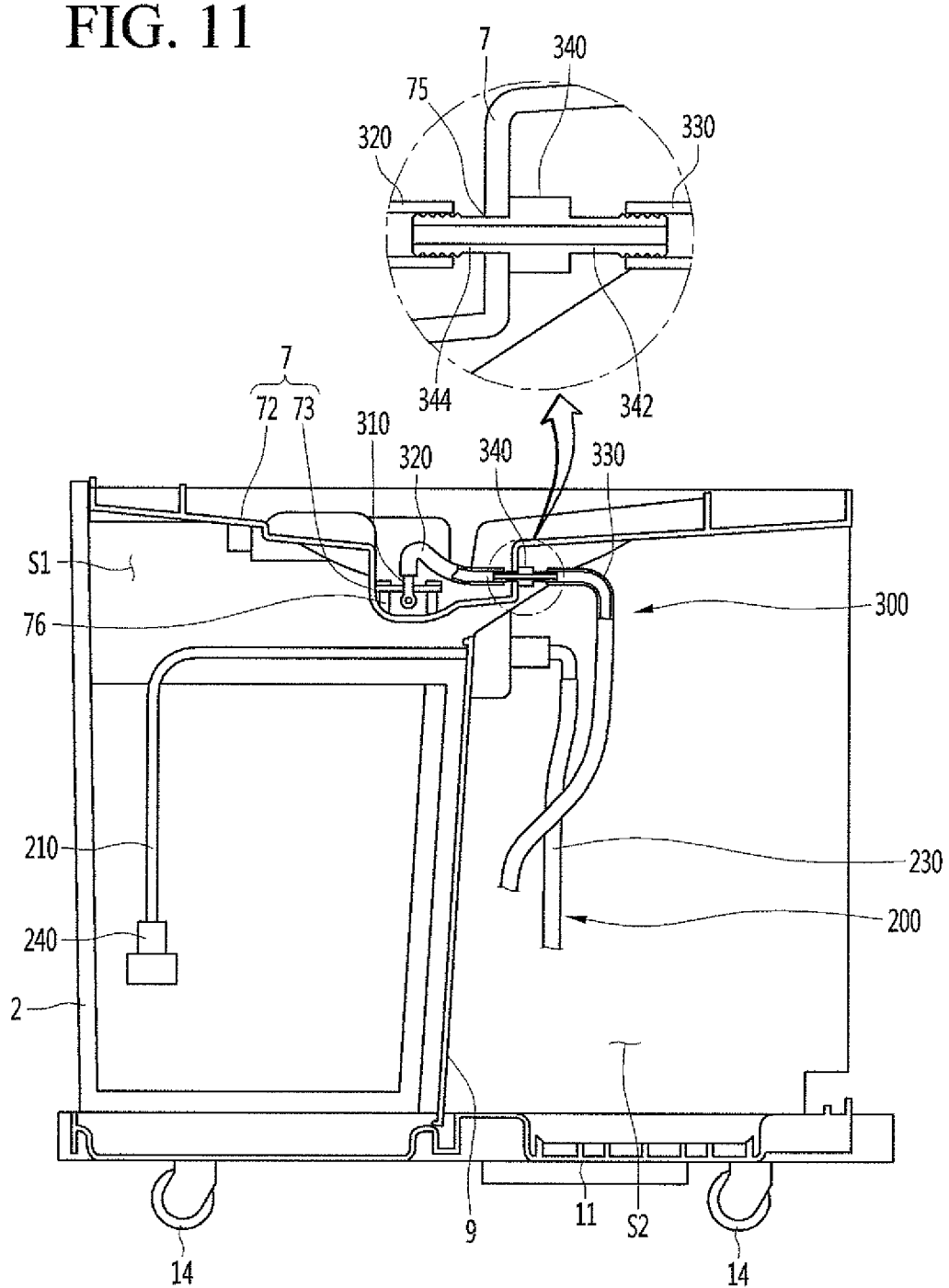
FIG. 11 is a cross-sectional view taken along line XI-XI of FIG. 9.
Figure 12:
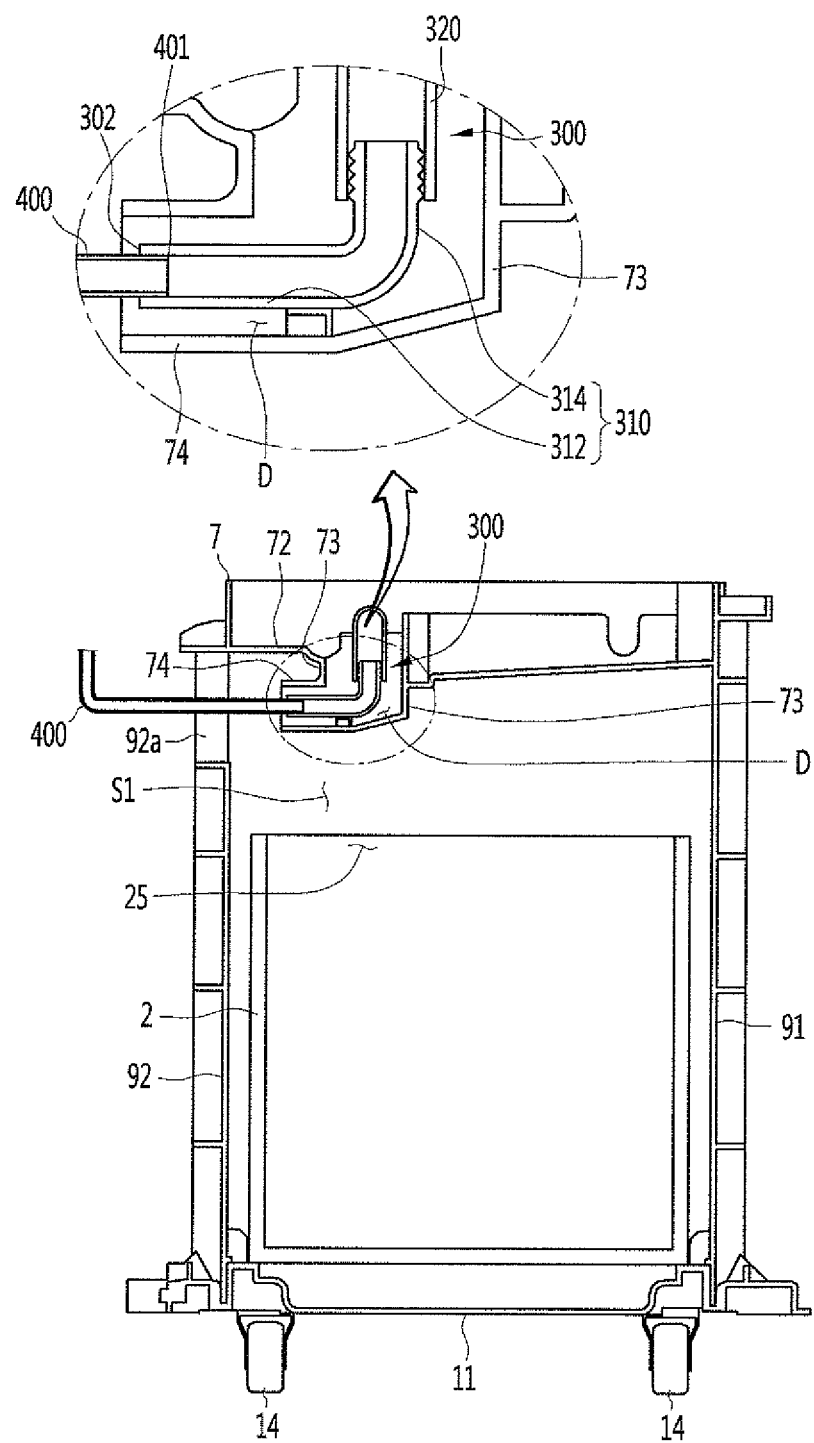
FIG. 12 is a cross-sectional view taken along line XII-XII of FIG. 9.

FIG. 7 is a rear view illustrating the inside of the dehumidifier according to an embodiment. FIG. 8 is a perspective view of the drain pan, the barrier, and the base according to an embodiment. FIG. 9 is a plan view of the drain pan according to an embodiment. FIG. 10 is a perspective view of the pump water inlet line, the pump, the pump water outlet line, and the outer tube according to an embodiment. FIG. 11 is a cross-sectional view taken along line XI-XI of FIG. 9. FIG. 12 is a cross-sectional view taken along line XII-XII of FIG. 9.

A drain passage D that guides the condensed water dropped from the evaporator 5 to the bucket 2 may be provided in the drain pan 7. The drain pan 7 may include a drain body 72 having an open top surface and provided with a support rib 71 that supports the condenser 4 and the evaporator 5. The drain pan 7 may include a water collection body 73 that collects the condensed water flowing along the drain body 72.

A bottom surface 72a of the drain body 72 may be inclined toward the water collection body 73, and the condensed water dropped to the drain body 72 may be collected into the water collection body 73 along the drain body 72. The water collection body 73 may protrude downward from the drain body 72. The water collection body 73 may have a shape a top surface of which is open, and a bottom surface of which is closed.

The drain conduit 74 from which the condensed water is drained may be provided in the drain pan 7, and the drain conduit 74 may drain the condensed water to the bucket space S1. When the bucket 2 is accommodated in the bucket space S1, the drain conduit 74 may be disposed above the bucket 2. The condensed water guided to the drain passage D to pass through the drain conduit 74 may be dropped into the drain conduit 74 and then be accommodated in the bucket 2.

The drain conduit 74 may protrude from the water collection body 73 and have a hollow shape. The drain conduit 74 may protrude horizontally from one side of the water collection body 73. The drain conduit 74 may be inclined downward toward an outlet end 74a thereof.

The drain conduit 74 may face the outer through-hole 15b (see FIGS. 5 and 6) of the casing 1. The drain conduit 74 may protrude backward from the water collection body 73. The drain passage D of the drain pan 7 may be disposed along the drain body 72, the water collection body 73, and the drain conduit 74.

The barrier 9 may be disposed between the base 11 and the drain pan 7. The barrier 9 may be disposed perpendicularly with respect to the bottom surface of the drain pan 7.

The dehumidifier may include a pair of bucket covers 91 and 92 which may be bent from the barrier 9. A bucket cover through-hole 92a (see FIG. 12), through which the outer tube 400 may pass, may be defined in one of the pair of bucket covers 91 and 92.

The dehumidifier may include a waterproof wall 94 that covers an upper side of the pump 100. The waterproof wall 94 may protrude from the barrier 9 to the machine room S2. The waterproof wall 94 may protrude from the barrier 9 so as to be disposed above an upper end of the pump 100. The waterproof wall 94 may protrude from a surface of the barrier 9, which faces the machine room S2, toward the machine room S2. The waterproof wall 94 may be disposed between the drain pan 7 and the pump 100 to block the condensed water so that the condensed water dropped from the drain pan 7 or the pump water outlet line 300 is not dropped into the pump 100.

The waterproof wall 94 may be disposed closer to the pump 100 among the drain pan 7 and the pump 100 and be disposed above the pump 100 to protect the pump 100. The waterproof wall 94 is not limited to merely blocking the condensed water but may reinforce a strength of the barrier 9, and more particularly, may reinforce a strength of a portion of the barrier 9, on which the pump 100 is mounted.

The dehumidifier may include a bucket drain passage that forcibly pumps the condensed water within the bucket 2 to drain the condensed water. The dehumidifier may include the pump 100, the pump water inlet line 200, the pump water outlet line 300, and the outer tube 400. The pump 100, the pump water inlet line 200, the pump water outlet line 300, and the outer tube 400 may constitute the bucket drain passage through which the condensed water within the bucket 2 may be pumped to be drained to a place which is at a distance from the dehumidifier.

When the pump 100 is driven, the condensed water within the bucket 2 may sequentially pass through the pump water inlet line 200, the pump 100, the pump water outlet line 300, and the outer tube 400 and then be drained through the outlet of the outer tube 400. As illustrated in FIG. 10, one or a first end 401 of the outer tube 400 may be inserted into the dehumidifier and then connected to the pump water outlet line 300 within the dehumidifier and also may extend to the outside of the dehumidifier. That is, the outer tube 400 may be selectively connected to the dehumidifier. If the user does not wish, the outer tube 400 may be separated from the pump water outlet line 300 so as to be stored or discarded.

The pump 100 may be accommodated in the machine room S2. The pump 100 may be installed on the barrier 9. More particularly, the pump 100 may be installed on the surface of the barrier 9, which faces the machine room S2.

The pump 100 may include a DC motor, more particularly, a DC geared motor having gears. The pump 100 may have a capacity such that a large amount of condensed water may be quickly drained. The pump 100 may include the DC motor in consideration of fire risk.

The pump 100 may include a pump case 103 in which a water inlet 101 and a water outlet 102 may be provided, and DC geared motor 104 coupled to the pump case 103. The DC geared motor 104 may be disposed on an upper portion of the pump case 103. The pump 100 may be coupled to the barrier 9 by a coupling member, such as a screw.

One or a first end of the pump water inlet line 200 may be inserted into the bucket 2, and the other or a second end of the pump water inlet line 200 may be connected to the water inlet 101 of the pump 100 so that condensed water within the bucket 2 may be guided into the pump 100. The pump water inlet line 200 may be an assembly of a plurality of members, which will be described hereinafter with reference to FIG. 13.

An inlet 301 of the pump water outlet line 300 may be connected to the pump 100. An outlet 302 of the pump water outlet line 300 may be disposed above the bucket 2 or may be disposed in the drain passage D.

The outer tube 400 may be connected to the pump water outlet line 300. As illustrated in FIG. 12, the outer tube 400 may be disposed above the bucket 2 or in the drain passage D and be connected to the pump water outlet line 300. A connection portion between the outer tube 400 and the pump water outlet line 300 may be disposed in the drain passage D or above the bucket 2.

When the outer tube 400 is connected to the pump water outlet line 300 at a position other than an inside of the drain passage D or above the bucket 2, water leaking from the connection portion of the outer tube 400 and the pump water outlet line 300 may not be dropped into the bucket 2, but may flow around the base 11 or the dehumidifier. On the other hand, as illustrated in FIG. 12, when the outer tube 400 is connected to the pump water outlet line 300 above the bucket 2 or in the drain passage D, the water leaking from the connection portion of the outer tube 400 and the pump water outlet line 300 may be dropped into the bucket 2 through the drain passage D or may be directly dropped into the bucket 2 to cleanly maintain an inside of the dehumidifier or a periphery of the dehumidifier.

The outlet 302 of the pump water outlet line 300 may be disposed inside the drain conduit 74, as illustrated in FIGS. 10 and 12. In this case, the outer tube 400 may be connected to the outlet 302 inside the drain conduit 74. The first end 401 of the outer tube 400 may be inserted into the drain conduit 74, more particularly, may be inserted into the outlet 302 inside of the drain conduit 74. The connection portion of the outer tube 400 and the pump water outlet line 300 may be disposed in the drain passage D, and the water leaking from the connection portion may be dropped into the drain passage D and then dropped into the bucket 2 through the drain conduit 74.

As described above, when the outlet 302 of the pump water outlet line 300 is disposed inside of the drain conduit 74, and the connection portion of the outer tube 400 and the pump water outlet line 300 is disposed in the drain passage D, the connection portion of the outer tube 400 and the pump water outlet line 300 may be surrounded by the drain conduit 74 and protected by the drain conduit 74.

The outlet 302 of the pump water outlet line 300 may not be disposed inside of the drain conduit 74, but rather, may be disposed outside of the drain conduit 74. In this case, a portion including the outlet 302 of the pump water outlet line 300 may extend to the outside of the drain conduit 74 and be disposed around the drain conduit 74, and the outer tube 400 may be inserted into the outlet 302 around the drain conduit 74. The connection portion of the outer tube 400 and the pump water outlet line 300 may be disposed above the bucket 2, and water leaking from the connection portion of the outer tube 400 and the pump water outlet line 300 may be directly dropped into the bucket 2.

Hereinafter, pump water outlet line 300 will be described.

The pump water outlet line 300 may include a plurality of members or components sequentially connected to each other in a flow direction of the condensed water.

At least a portion of the pump water outlet line 300 may include a water outlet fitting 310 accommodated in the drain passage D and connected to the outer tube 400 and a water outlet tube 320 connected to the water outlet fitting 310. The water outlet fitting 310 may be mounted to the drain pan 7 and a position of the outer tube 400 inserted from the outside of the dehumidifier may be connected to the water outlet fitting 310 inside of the drain pan 7.

The water outlet fitting 310 may be disposed between the outer tube 400 and the water outlet tube 320 to allow the outer tube 400 and the water outlet tube 320 to communicate with each other. All or a portion of the water outlet fitting 310 may be disposed in the drain passage D. The water outlet fitting 310 may be smaller than the drain conduit 74.

The water outlet fitting 310 may have a cross-sectional area less than a cross-sectional area of the drain passage provided in the drain conduit 74. All or a portion of the water outlet fitting 310 may be accommodated in the drain conduit 74. An outlet of the water outlet fitting 310 may be the outlet 302 of the pump water outlet line 300. For example, the outlet of the water outlet fitting 310 may be disposed inside of the drain conduit 74. In another example of the water outlet fitting 310, the outlet of the water outlet fitting 310 may not be disposed inside of the drain conduit 74, but rather, may be disposed above the bucket 7.

The water outlet fitting 310 may include an outer tube connection portion 312 at least a portion of which may be disposed in the drain conduit 74 and a water outlet tube connection portion 314 bent from the outer tube connection portion 312.

A fixing portion 76 that fixes the pump water outlet line 300 to the drain pan 7 may be disposed on or in the drain passage D. The fixing portion 76 may fix a position of the outlet 302 of the pump water outlet line 300. The fixing portion 76 may fix the water outlet fitting 310 including the outlet 302 of the pump water outlet line 300. The fixing portion 76 may be disposed in the drain pan 7 so as to be disposed on the drain passage D.

The water outlet fitting 310 may be fixed to the fixing portion 76 using a coupling member, such as a screw. In this case, the fixing portion 76 may include a boss disposed on the drain passage D so that the coupling member, such as the screw, may be coupled thereto.

The water outlet fitting 310 may be fixed to the fixing portion 76 in a snap fit manner. A hook may be disposed on any one of the drain pan 7 or the water outlet fitting 310, and a hook latch rib to which the hook is detachable may be disposed on the other one of the drain pan 7 or the water outlet fitting 310. The fixing portion 76 may be provided as the hook or the hook latch rib.

The outer tube connection portion 312 may be disposed lengthwise inside of the drain conduit 74 in a direction in which the drain conduit 74 is open. The water outlet tube connection portion 314 may be bent perpendicularly with respect to the outer tube connection portion 312. The water outlet tube connection portion 314 may be bent upward from one end of the outer tube connection portion 312.

The water outlet tube 320 may be connected to the water outlet fitting 310, more particularly, the water outlet tube connection portion 314. The water outlet tube 320 may be inserted onto an outside of the water outlet tube connection portion 314.

For example, the water outlet tube 320 may have one or a first end connected to the water outlet 102 of the pump 100 and the other or a second end connected to the water outlet fitting 310. The condensed water pumped by the pump 100 may sequentially pass through the water outlet tube 320 and the water outlet fitting 310 and then be drained to the outer tube 400.

The water outlet tube 320 may bypass an edge of the drain pan 7 to extend to the water outlet 102 of the pump 100 and then be directly connected to the water outlet 102 of the pump 100. Alternatively, the water outlet tube 320 may pass through the drain pan 7 to extend to the water outlet 102 of the pump 100 and then be directly connected to the water outlet 102 of the pump 100. When the water outlet tube 320 passes through the drain pan 7, a hole through which the water outlet tube 320 passes may be defined in the drain pan 7, and a sealing member that seals a gap between the hole and the water outlet tube 320 may be disposed on the drain pan 7.

For another example, the water outlet tube 320 may have one or a first end connected to a connecting fitting 340 and the other or a second end connected to the water outlet fitting 310. In this case, the condensed water may sequentially pass through the connecting fitting 340, the water outlet tube 320, and the water outlet fitting 310 and then be drained to the outer tube 400.

As illustrated in FIGS. 10 and 11, the pump water outlet line 300 may further include a pump tube 330 connected to the water outlet 102 of the pump 100 and connecting fitting 340 connected to each of the pump tube 330 and the water outlet tube 320.

The pump tube 330 may have one or a first end provided as the inlet 301 of the pump water outlet line 300, and the pump tube 330 may have another or a second end connected to the water outlet 102 of the pump 100. The second end of the pump tube 330 may be inserted onto an outside of the water outlet 102 of the pump 100.

The second end of the pump tube 330 may be connected to the connecting fitting 340, more particularly, the pump tube connection portion 342. The second end of the pump tube 330 may be inserted onto an outside of the pump tube connection portion 342.

A hole 75 may be defined in one side of the drain fan 7, and the pump water outlet line 300 may be disposed to pass through the hole 75 of the drain pan 7. The connecting fitting 340 among the components of the pump water outlet line 300 may be disposed in the hole 75.

A pump tube connection portion 342 by which the pump tube 330 may be connected to the outside of the drain pan 7 may be disposed on the connecting fitting 340. A water outlet tube connection portion 344 through which the water outlet tube 330 may be connected to the drain passage D may be disposed on the connecting fitting 340. A passage through which the condensed water may pass from the pump tube connection 342 to the water outlet tube connection portion 344 may be provided in the connecting fitting 340.

Figure 13:
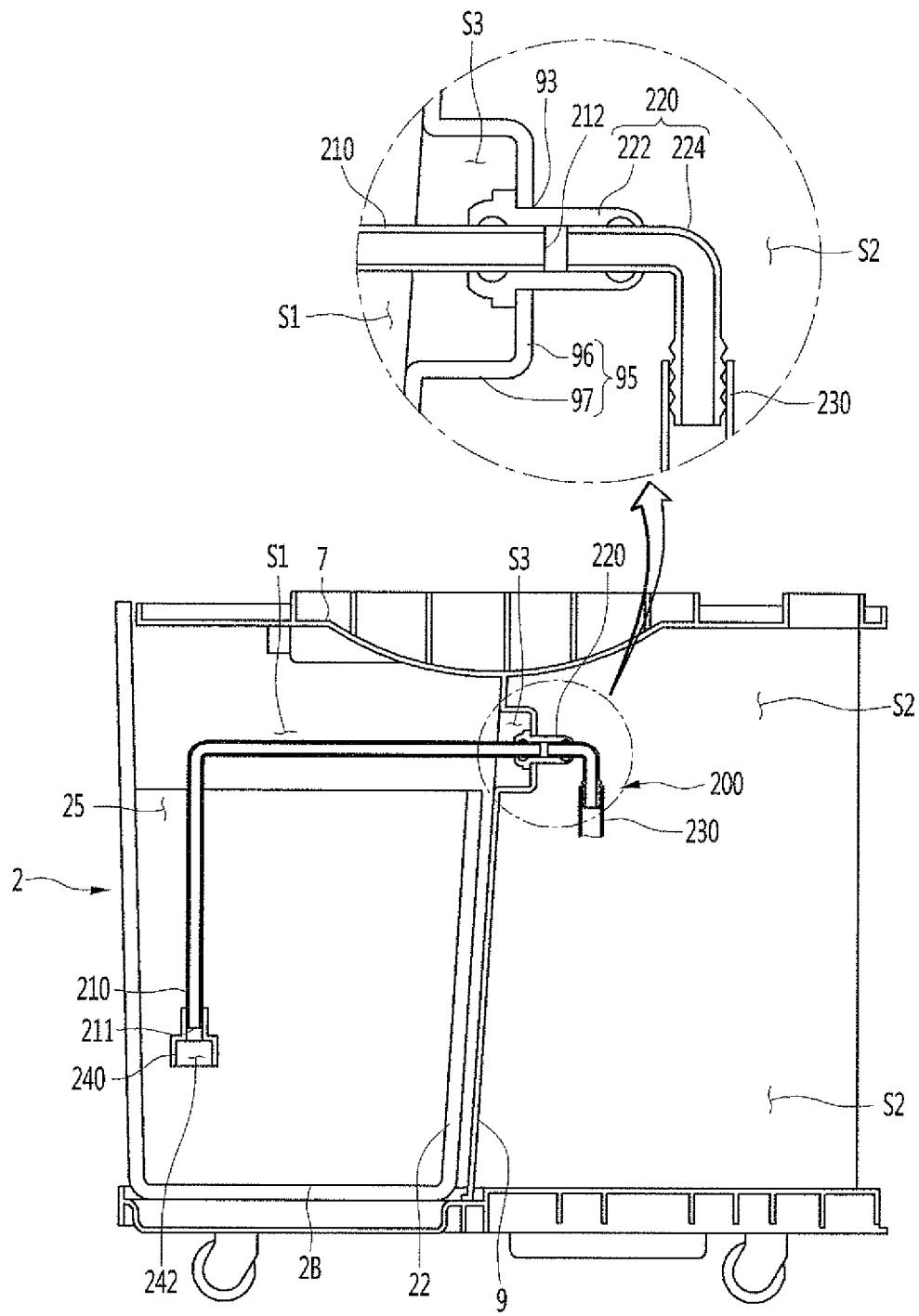
FIG. 13 is a cross-sectional view taken along line XIII-XIII of FIG. 9.

FIG. 13 is a cross-sectional view taken along line XIII-XIII of FIG. 9.

The pump water inlet line 200 may be connected to the pump 100 to guide the condensed water of the bucket 2 to the pump 100. The dehumidifier may include a flexible tube 210 capable of being inserted into the bucket 2. The flexible tube 210 may be made of a bendable material, for example, and a portion of the flexible tube 210 may be inserted into the bucket 2.

The flexible tube 210 may have one or a first end which is a free end into which water is introduced and the other or a second end which is fixed and from which the water is discharged. The user may hold the flexible tube 210 to insert a portion of the flexible tube 210 into the bucket 2. When the condensed water is fully filled in the bucket 2, one or a first end 211 of the flexible tube 210 may be immersed in the condensed water within the bucket 2.

When the pump 100 is driven, the flexible tube 210 may be a suction tube that suctions the condensed water within the bucket 2. The other or a second end 212 of the flexible tube 210 may be connected to the water inlet 101 (see FIG. 10) of the pump 100 and be fixed to the pump 100. When the pump 100 is driven, the condensed water guided to the flexible tube 210 may be directly pumped by the pump 100. When the pump 100 is disposed in the machine room S2, a water inlet line through-hole 93, through which the flexible tube 210 may pass, may be defined in the barrier 9. The flexible tube 210 may pass through the water inlet line through-hole 93 defined in the barrier 9 and then be connected to the pump 100. In this case, the barrier 9 may include a sealing member (not shown) that blocks a gap between the flexible tube 210 and the barrier 9. When a portion of the flexible tube 210 is inserted into the bucket 2, the one end 211 of the flexible tube 210 may be disposed as close as possible to the bottom surface 2b of the bucket 2.

The dehumidifier may further include a weight 240 installed on the first end 211 of the flexible tube 210 and having a weight by which the flexible tube 210 is bent downward. A water inlet passage that guides the condensed water of the bucket 2 to an inside of the flexible tube 210 may be provided in the weight 240.

The weight 240 may be inserted into the bucket 2 together with a portion of the flexible tube 210 and may pull the one end 211 of the tube 210 toward the inner bottom surface 2b of the bucket 2. The flexible tube 210 may be inserted into the opening 25 of the bucket 2 together with the weight 240, and a portion which is inserted into the bucket 2 through the opening 25 may be immersed in the condensed water within the bucket 2 together with the weight 240.

The flexible tube 210 may be selectively connected by the user. For this, the dehumidifier may include a separate fitting to which the flexible tube 210 may be separably connected. The fitting may be a barrier fitting 220 installed on the barrier 9.

When the dehumidifier further includes the barrier fitting 220, the dehumidifier may further include a pump water inlet tube 230 connected to the pump 100, and the pump water inlet tube 230 may be connected to the barrier fitting 220. When the user connects the flexible tube 210 to the barrier fitting 220, the flexible tube 210, the barrier fitting 220, and the pump water inlet tube 230 may constitute the pump water inlet line 200 guiding the condensed water within the bucket 2 so as to be introduced into the pump 100. The condensed water within the bucket 2 may sequentially pass through the flexible tube 210, the barrier fitting 220, and the pump water inlet tube 230 and then be introduced into the pump 100. The second end 212 of the flexible tube 210 may be connected and fixed to the barrier fitting 220, and the first end 211 of the flexible tube 210 may be inserted into the bucket 2 or withdrawn to the outside of the bucket 2 in a free end state.

The water inlet line through-hole 93 through which the pump water inlet line 200 may pass may be defined in the barrier 9. The barrier fitting 220 may be disposed in the water inlet line through-hole 93. The barrier fitting 220 may be mounted higher than the barrier facing plate 22 of the bucket 2. The barrier fitting 220 may be mounted higher than the pump 100.

The barrier fitting 220 may have a shape as a whole. The barrier fitting 220 may be constituted by a plurality of members. The barrier fitting 220 may include a first tube fitting 222 to which the flexible tube 210 may be connected and a second tube fitting 224 which may be connected to the first tube fitting 222 and to which the pump water inlet tube 230 may be connected. The first tube fitting 222 may pass through the water inlet line through-hole 93 and may have one or a first end that protrudes into the bucket space S1 and the other or a second end that protrudes into the machine room S2.

The second end 212 of the flexible tube 210 may be inserted into the first tube fitting 222 and separably connected to the first tube fitting 222. The second tube fitting 224 may be connected to the first tube fitting 222 so as to be disposed in the machine room S2. A portion of the second tube fitting 224 may be inserted into the first tube fitting 222 and maintained in a state of being connected to the first tube fitting 222.

A fitting mounting portion or mount 95 on which the barrier fitting 220 may be mounted may be disposed on the barrier 9. The fitting mount 95 may protrude in an opposite direction of the bucket space S1, that is, away from the bucket space S1.

The fitting mount 95 may protrude from the barrier 9 into the machine room S2. The fitting mount 95 may be disposed below the drain pan 7 so as to be spaced apart from the drain pan 7.

A space may be defined inside of the fitting mount 95. A surface of the fitting mount 95, which faces the bucket space S1, may be open. A tube space S3, into which the flexible tube 210 may be inserted and connected to the barrier fitting 220 may be defined inside of the fitting mount 95. The water inlet line through-hole 93 through which the pump water inlet line 200 may pass may be defined in the fitting mount 95. The barrier fitting 220 may be disposed in the water inlet line through-hole 93. A portion of the barrier fitting 220 may protrude toward the tube space S3, and the second end 212 of the flexible tube 210 may pass through the tube space S3 so as to be connected to the barrier fitting 220 or may be connected to the barrier fitting 220 in the tube space S3.

The fitting mount 95 may include a mount 96 on which the barrier fitting 220 may be mounted to pass therethrough. The fitting mount 95 may include a protection body 97 that connects the barrier 9 to the mount 96 and surrounds the connection portion of the barrier fitting 220 and the flexible tube 210.

The pump water inlet tube 230 may have one or a first end connected to the barrier fitting 220 and the other or a second end connected to the water inlet 101 of the pump 100 to guide the condensed water passing through the barrier fitting 220 to the water inlet 101 of the pump 100. The pump water inlet tube 230 may be disposed in the machine room S2 and connected to the barrier fitting 220 and the pump 100 inside the machine room S2.

Figure 14:
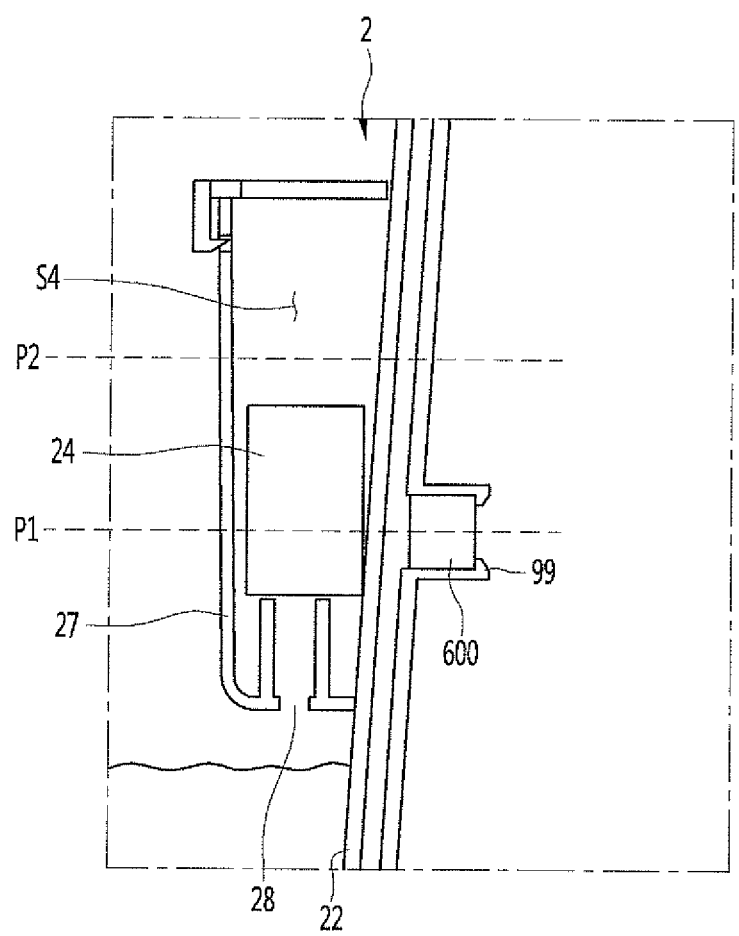
FIG. 14 is a cross-sectional view when a water level in the bucket is not full according to an embodiment.
Figure 15:
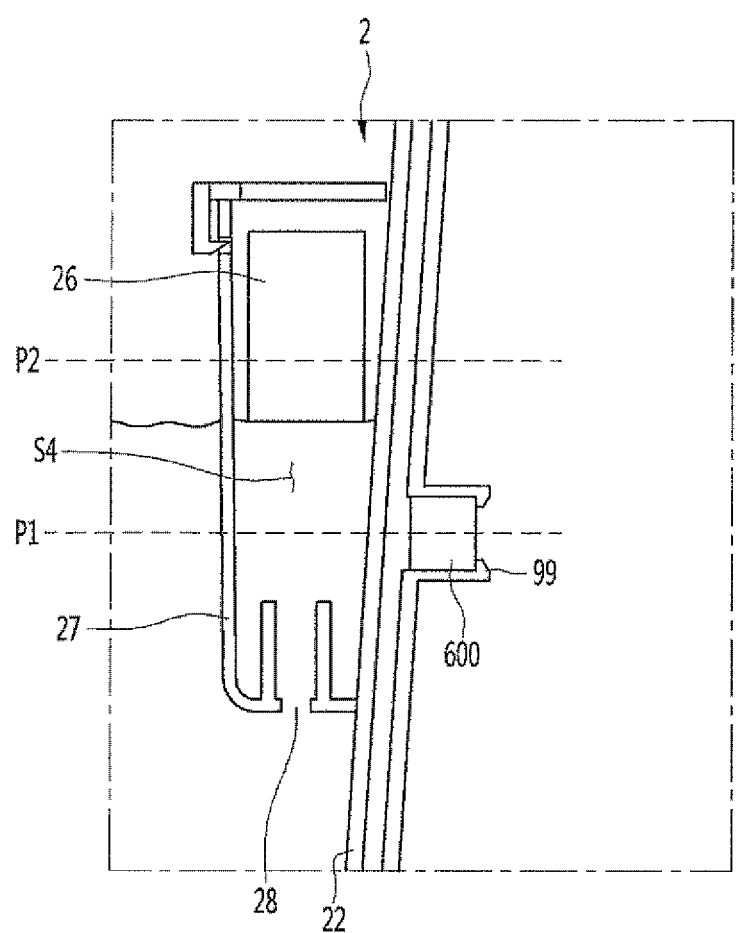
FIG. 15 is a cross-sectional view when the water level in the bucket is full according to an embodiment.

FIG. 14 is a cross-sectional view when a water level in the bucket is not full according to an embodiment. FIG. 15 is a cross-sectional view when the water level in the bucket is full according to an embodiment.

The dehumidifier may further include a water level sensor 600 that detects a water level in the bucket 2. The water level sensor 600 may be mounted at a height at which a full water level of the condensed water within the bucket 2 is detected.

A float which may be elevated according to a level of the condensed water may be provided in the bucket 2, and a float guide 27 which elevates and guides the float 26 may be provided on the bucket 2. A space S4 in which a float 26 may be elevatably accommodated may be defined in the float guide 27. An entrance 28 through which the condensed water may be introduced and discharged may be provided in the float guide 27. The barrier facing plate 22 of the bucket 2 may be disposed on the float guide 27. The float guide 27 may be disposed on a surface, which faces the inside of the bucket 2, of both surfaces of the barrier facing plate 22 of the bucket 2.

The water level sensor 600 may detect a height of the float 26 elevated along the float guide 27 to detect a level of the condensed water. Thus, the water level sensor 600 may detect whether the condensed water is fully filled according to a height at which the float 26 is disposed.

The water level sensor 600 may be mounted on the barrier 9. A water level sensor mounting portion or mount 99 on which the water level sensor 600 may be mounted to face the bucket 2 may be disposed on the barrier 9. The water level sensor mount 99 may include at least one hook on which the water level sensor 600 may be separably mounted.

The water level sensor 600 may be provided as a non-contact type sensor, such as a hall sensor or an optical sensor, which detects a height of the float 26 in a state of non-contacting the float 26. The non-contact type sensor may be a water level sensor that is spaced apart from the bucket 2 and the float 26 to detect the height of the float 26 in the non-contact manner.

An example of a non-contact type sensor is a hall sensor in which a voltage is generated by a magnet. In this case, the float 26 may include a magnet that operates the hall sensor.

Another example of a non-contact type sensor is a sensor including a light emitting portion and a light receiving portion. In this case, the float 26 may include a reflection portion capable of reflecting light emitted from the light emitting portion to the light receiving portion.

An example of a contact type sensor is a limit switch that is switched according to the height of the float 26. In this case, the float 26 may be provided with a protrusion that contacts a contact portion of the limit switch to turn on the limit switch.

The above-described water level sensor 600 may detect a level of the condensed water, more particularly, a full water level of the condensed water in a non-contact manner. However, embodiments are not limited to the above-described examples. For example, as long as the height of the float 26 is detected, various types of sensors, such as an ultraviolet sensor, may be applicable.

When the bucket 2 is not sufficiently inserted into the dehumidifier, the contact type sensor may cause a malfunction of the water level sensor 600. Thus, the water level sensor 600 may be provided as the non-contact type sensor. Hereinafter, an example in which the water level sensor 600 is provided as the non-contact type sensor, more particularly, a hall sensor will be described.

When a level of the condensed water within the bucket 2 is low, the float 26 may be disposed at a low height within the float guide 27, for example, at a first height P1, as illustrated in FIG. 14. In this case, the float 26 may be disposed at the same height as the water level sensor 600, and a voltage may be generated in the water level sensor 600.

When a level of the condensed water within the bucket 2 is high, the float 26 may be disposed at a high height within the float guide 27, for example, at a second height P2, as illustrated in FIG. 15. In this case, the float 26 may be disposed at a height greater than the height of the water level sensor 600, and a voltage may not be generated in the water level sensor 600. A controller 700 illustrated in FIG. 16 may detect whether the level of the condensed water is full according to the presence/absence of the voltage generated in the water level sensor 600, thereby controlling the dehumidifier.

Figure 16:
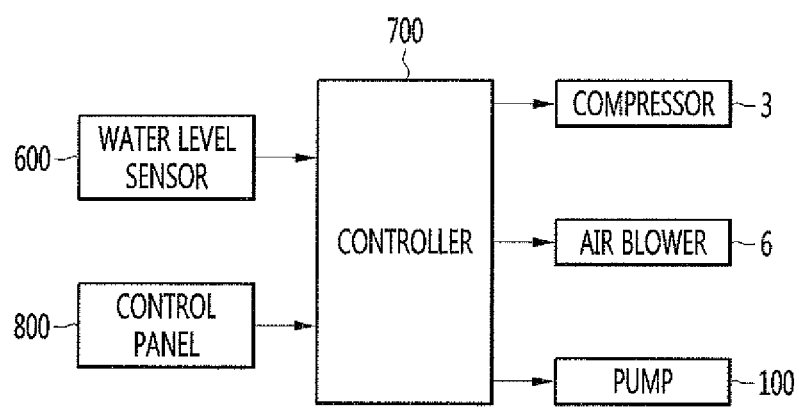
FIG. 16 is a block diagram of a dehumidifier according to an embodiment.

FIG. 16 is a block diagram of the dehumidifier according to an embodiment.

The dehumidifier may include the controller 700 that controls the compressor 3, the air blower 6, and the pump 100. The controller 700 may drive/stop the pump 100 according to the detected result of the water level sensor 600. When a full water level is detected by the water level sensor 600, the pump 100 may be driven.

The dehumidifier may be configured so that the user is capable of selecting a condensed water drain mode using the pump 100. The control panel 800 may provide an input through which the condensed water drain mode may be selected by the user. When the user selects the condensed water drain mode through the control panel 800, the pump 100 may operate according to whether the condensed water drain mode is input and the detected result of the water level sensor 600.

In a state in which the condensed water drain mode is input through the control panel 800, if the full water level of the condensed water is detected by the water level sensor 600, the controller 700 may drive the pump 100. The controller 700 may stop the pump 100 when a set or predetermined time has elapsed after the pump 100 is driven.

Hereinafter, operations of the above-described components according to embodiments disclosed herein will be described.

The user may desire to drain the condensed water within the bucket 2 from the dehumidifier to a remote place. In this case, the user may separate the bucket 2 of FIG. 1 to the outside as illustrated in FIG. 3 and then connect the flexible tube 210 to the barrier fitting 220, as illustrated in FIG. 13.

The user may insert the second end 212 of the weight 240 of the flexible tube 210 into the barrier fitting 220. In a state in which the flexible tube 210 is connected to the barrier fitting 220, the user may put a portion of the flexible tube 210 and the weight 240 into the bucket 2 through the opening 25 of the bucket 2, as illustrated in FIG. 13, while inserting a portion of the bucket 2 into the bucket space S1. Then, the bucket 2 may be deeply inserted into the bucket space S1.

As described above, the user may insert the first end 401 of the outer tube 400 into the outer through-hole 15b defined in the casing 1, as illustrated in FIG. 6, before or after the flexible tube 210 is connected. Alternatively, the user may connect the first end 401 of the outer tube 400 to the pump water outlet line 300 in the drain conduit 74 or above the bucket 2, as illustrated in FIG. 12. The user may insert the first end 401 of the outer tube 400 into the water outlet fitting 310 of the pump water outlet line 300 and maintain the state in which the outer tube 240 is connected to the pump water outlet line 300.

The user may allow the outer tube 240 to extend lengthwise to a location at which drain of condensed water is desired in a state in which the outer tube 240 is connected to the pump water outlet line 300. The user may input a dehumidification command after inputting the condensed water drain mode through the control panel 800, and the controller 700 may drive the humidifier in the dehumidification operation mode.

Figure 17:
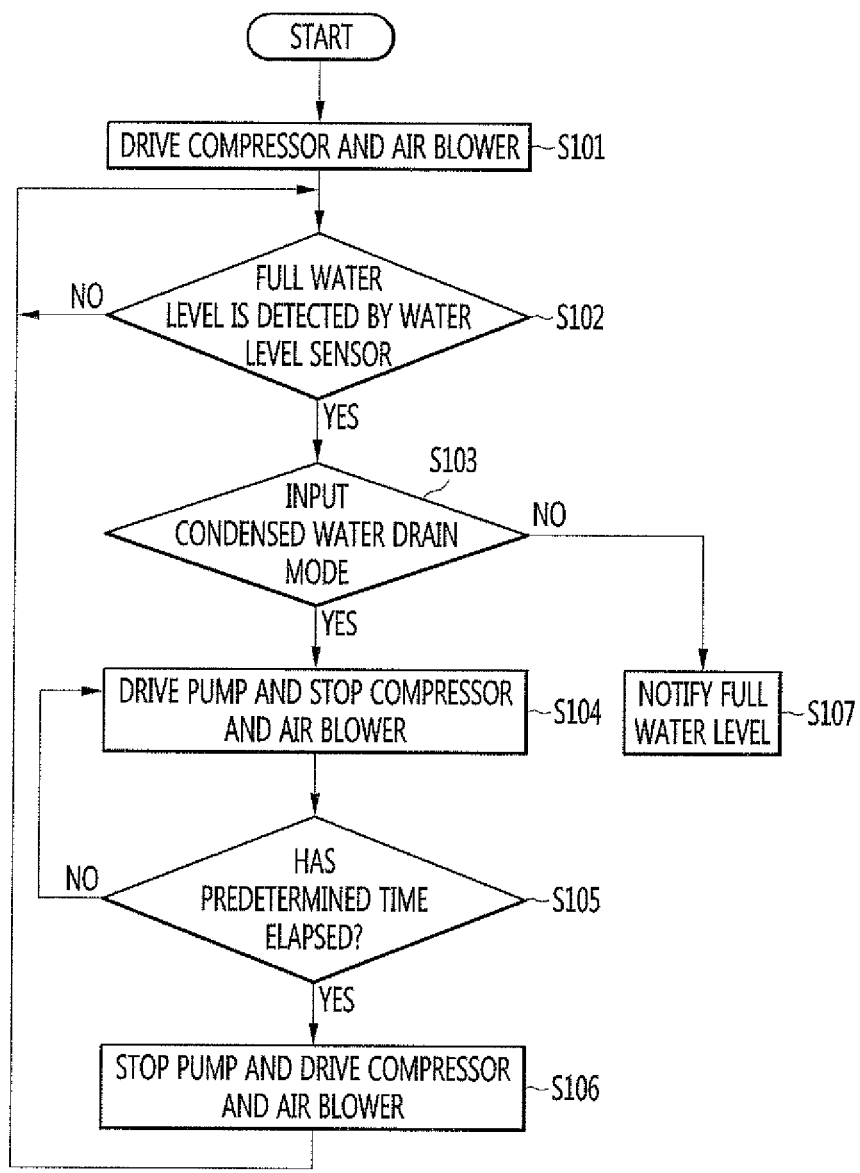
FIG. 17 is a flowchart illustrating a method for driving a dehumidifier according to an embodiment.

FIG. 17 is a flowchart illustrating a method for driving a dehumidifier according to an embodiment.

Controller 700 may drive compressor 3 and air blower 6 when a dehumidification operation is input through control panel 800 (S101). When the air blower 6 is driven, air outside of the dehumidifier may be dehumidified while being suctioned into evaporator 5 and cooled. Thereafter, the air may increase in temperature while passing through condenser 4 and then be exhausted to the outside of the dehumidifier through the air blower 6.

While the dehumidifier operates as described above, condensed water may be dropped onto a surface of the evaporator 5. The condensed water may be dropped into bucket 2 after passing through drain passage D of drain pan 7.

Thus, the bucket 2 may be gradually filled with the condensed water. Then, when the condensed water rises to a predetermined height, water level sensor 600 may detect a full water level of the condensed water (S102).

When the full water level of the condensed water is detected in a state in which a condensed water drain mode is input through the control panel 800, the controller 700 may start the condensed water drain mode to drive pump 100 (S103 and S104). The controller 700 may stop the compressor 3 and the air blower 6 in the condensed water drain mode (S104).

When the pump 100 is driven, the condensed water within the bucket 2 may sequentially pass through the flexible tube 210, the barrier fitting 220, and the pump water inlet tube 230, and then be introduced into the pump 100. Then, the condensed water may be discharged from the pump 100 to pump tube 330. The condensed water of the pump tube 330 may sequentially pass through connecting fitting 340, water outlet tube 320, and water outlet fitting 310 to flow to outer tube 400. Then, the condensed water may be pumped to be drained to a location which is desired by the user through the outer tube 400.

When a predetermined time has elapsed after the pump 100 is driven, the controller 700 may stop the pump 100 (S105). Also, the controller 700 may drive the compressor 3 and the air blower 6, which are in a stopped state (8106).

The predetermined time may be a predetermined time in consideration of a capacity of the bucket 2. Thus, the predetermined time may be set to a time for which the condensed water within the bucket 2 is completely drained, or a minimum amount of condensed water remains. The predetermined time may be proportional to the capacity within the bucket 2. For example, the predetermined time may be set to a time for which the condensed water within the bucket 2 is capable of being drained with respect to the fully filled condensed water.

For example, if the capacity of the bucket 2 has a volume which is enough to drain the fully filled condensed water for 1 minute, the set time may be about 1 minute. When 1 minute has elapsed after the pump 100 is driven, the controller 700 may terminate the condensed water drain mode to stop the pump 100.

The capacity within the bucket 2 may be greater than a capacity within the drain passage D of the drain pan 7. In a state in which the condensed water is fully filled in the bucket 2, when the pump 100 is driven, a large amount of condensed water may be completely drained. When the drain is performed as described above, frequent turn on/off of the pump 100 may be minimized to maximize lifespan of the pump 100.

When the condensed water drain mode is not input through the control panel 800, the controller 700 may not drive the pump 100 even though the full water level of the condensed water is detected by the water level sensor 600. On the other hand, the controller 700 may inform the full water level of the condensed water to the outside through a notification mechanism (not shown), such as a display, or a buzzer, for example (S107). The notification mechanism, such as the display, or the buzzer, may be provided as an LED or a speaker, for example, which is provided on the control panel 800.

When the full water level of the condensed water accommodated in the bucket 2 is detected by the water level sensor 600, and the condensed water drain mode is not input through the control panel 800, the controller 700 may control the pump 100 and the notification mechanism to maintain the stopped state of the pump 100 and inform the full water level of the condensed water through the notification mechanism.

According to embodiments disclosed herein, as a portion of the flexible tube is easily inserted into the bucket through the opening of the bucket, the user may easily insert the flexible tube into the bucket to improve user convenience. Also, when compared with a case in which the bucket is connected to the pump water inlet line while the bucket moves, the possibility of leakage of condensed water may be reduced. In addition, the number of components may be reduced, and the base and periphery may be cleanly maintained.

When compared with structure in which the pump water inlet line is connected to the drain pan to drain the water within the drain pan to the pump water inlet line, the number of components may be further reduced, and the structure may be further simplified. Also, the pump water inlet line may include the barrier fitting through which the flexible tube and the pump water inlet tube may be connected to each other, and the flexible tube may be connected to the barrier fitting by the selection of the user.

When the pump water inlet line is not used, a separate plug for blocking the pump water inlet line may not be required to minimize the number of components. When the flexible tube is not used, the flexible tube may be separated from the barrier fitting and then separately stored, and thus, a capacity within the bucket may be maximized.

The flexible tube may be close to the bottom surface of the bucket by weight to minimize an amount of water remaining within the bucket when the pump is driven. Further, the connection portion of the flexible tube and the barrier fitting may be protected by the fitting mount, and leakage of condensed water, which occurs at the connection portion of the flexible tube and the barrier fitting, may be minimized. Furthermore, the user may easily recognize the position of the barrier fitting from the outside, and the user may easily connect the flexible tube to the barrier fitting.

The fitting mount may protrude from the barrier toward the machine room. Thus, the bucket space may be utilized to accommodate the bucket as much as possible, and the capacity within the bucket may be maximized.

Damage to the pump by the condensed water dropped from the drain pan or the pump water outlet line may be minimized.

Embodiments disclosed herein provide a dehumidifier in which a portion of a pump water inlet line is easily inserted into a bucket to improve user convenience.

In one embodiment, a dehumidifier may include a bucket; a drain pan including a drain passage configured to guide condensed water dropped from an evaporator to the bucket; a pump; a barrier configured to define a bucket space in which the bucket may be accommodated; and a pump water inlet line and a pump water outlet line, which are connected to the pump. The pump water inlet line may include a flexible tube a portion of which may be inserted into the bucket, and the bucket may include an opening into which a portion of the flexible tube may be inserted.

The pump water inlet line may further include a barrier fitting which may be installed on the barrier and to which the flexible tube may be separably connected, and a pump water inlet tube connected to the barrier fitting and the pump. The dehumidifier may further include a weight installed on one end of the flexible tube and having a weight by which the flexible tube may be bent downward. A water inlet passage through which the condensed water within the bucket may be guided to the inside of the flexible tube may be provided in the weight.

The bucket may further include a barrier facing plate that faces one surface of the barrier. The barrier fitting may be mounted higher than the barrier facing plate. A fitting mounting portion or mount which protrudes in an opposite direction of the bucket space and on which the barrier fitting may be mounted may be disposed on the barrier.

A tube space into which a portion of the barrier fitting may protrude and in which an outlet of the flexible tube may be connected to the barrier fitting may be defined in the fitting mounting portion. The fitting mounting portion may be disposed below the drain pan so as to spaced apart from the drain pan.

The fitting mounting portion may include a mount through which the barrier fitting may be mounted to pass, and a protection body configured to connect the barrier to the mount. The body may be configured to surround a connection portion of the barrier fitting and the flexible tube.

The barrier may partition a space in the dehumidifier into a machine room in which the pump may be accommodated and the bucket space, and the fitting mounting portion may protrude from the barrier into the machine room. The barrier fitting may be mounted higher than the pump.

The dehumidifier may further include a waterproof wall that protrudes from the barrier into the machine room to cover an upper side of the pump.

The above-disclosed subject matter is to be considered illustrative, and not restrictive, and the appended claims are intended to cover all such modifications, enhancements, and other embodiments, which fall within the true spirit and scope.

Thus, embodiments disclosed herein are to be considered illustrative, and not restrictive, and the technical spirit is not limited to the embodiments. Therefore, the scope is defined not by the detailed description but by the appended claims, and all differences within the scope will be construed as being included in the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dehumidifier, comprising:
   a bucket;
   a drain pan comprising a drain passage configured to guide condensed water dropped from an evaporator to the bucket;
   a pump;
   a barrier configured to define a bucket space in which the bucket is accommodated; and
   a pump water inlet line and a pump water outlet line, which are connected to the pump, wherein the pump water inlet line comprises:
      a flexible tube, a portion of which is inserted into the bucket;
      a barrier fitting which is installed on the barrier and to which the flexible tube is separably connected; and
      a pump water inlet tube connected to the barrier fitting and the pump, wherein the bucket has an opening into which a portion of the flexible tube is inserted, wherein the pump water inlet line is configured to guide the condensed water in the bucket to the pump, and wherein the pump water inlet line comprises:
      a first end, which is a free end into which the condensed water in the bucket is introduced; and
      a second end connected to the pump, wherein the dehumidifier further comprising a weight installed on one end of the flexible tube to bend the flexible tube downward, wherein the weight is inserted into the bucket and pulls the first end of the tube toward an inner bottom surface of the bucket, wherein the weight is immersed in the condensed water within the bucket, wherein a fitting mount on which the barrier fitting is mounted is disposed on the barrier, and wherein a tube space is provided into which a portion of the barrier fitting protrudes and through which an outlet of the flexible tube is connected to the barrier fitting.

2. The dehumidifier according to claim 1, wherein the weight comprises a water inlet passage configured to guide the condensed water in the bucket to an inside of the flexible tube.

3. The dehumidifier according to claim 1, wherein the barrier fitting is mounted at a position higher than the pump.

4. The dehumidifier according to claim 1, wherein the bucket comprises a barrier facing plate that faces one surface of the barrier, and wherein the barrier fitting is disposed at a position higher than an upper end of the barrier facing plate.

5. The dehumidifier according to claim 1, wherein the fitting mount is spaced downward from the drain pan.

6. The dehumidifier according to claim 1, wherein the fitting mount comprises:
   a mount through which the barrier fitting is mounted to pass; and
   a protection body configured to connect the barrier to the mount, the protection body being configured to surround a connection portion of the barrier fitting and the flexible tube.

7. The dehumidifier according to claim 1, wherein the fitting mount protrudes from the barrier in a direction away from the bucket space.

8. The dehumidifier according to claim 1, wherein the barrier partitions a space into a machine room, in which the pump is accommodated, and the bucket space, and the fitting mount protrudes from the barrier into the machine room.

9. The dehumidifier according to claim 8, further comprising a waterproof wall that protrudes from the barrier into the machine room to cover an upper side of the pump.

10. The dehumidifier according to claim 1, further comprising:
    a float configured to be elevated along a float guide disposed on the bucket;
    a water level sensor configured to sense a full water level according to a height of the float; and
    a controller configured to drive the pump when the full water level is sensed by the water level sensor and stop the pump when a predetermined time has elapsed after the pump is driven.

11. A dehumidifier, comprising:
    a bucket;
    a drain pan configured to guide condensed water dropped from an evaporator to the bucket, the drain pan including a drain body, a water collection body, the drain body being inclined toward the water collection body, and a drain conduit;

a pump;

a barrier configured to define a bucket space in which the bucket is accommodated; and a pump water inlet line and a pump water outlet line, which are connected to the pump, wherein the pump water inlet line comprises a flexible tube a portion of which is inserted into the bucket, wherein the bucket has an opening into which a portion of the flexible tube is inserted, wherein the bucket is configured to be removed from the dehumidifier to empty the condensed water in the bucket, the condensed water of the pump water outlet line is configured to be drained through an outer tube connected to a water outlet fitting, or the condensed water of the drain conduit is configured to be drained through a drain hose connected to the drain conduit, wherein the pump water inlet line further comprises:

a barrier fitting which is installed on the barrier and to which the flexible tube is separably connected; and a pump water inlet tube connected to the barrier fitting and the pump, wherein the pump water inlet line is configured to guide the condensed water in the bucket to the pump, wherein the pump water inlet line comprises:

a first end, which is a free end into which the condensed water in the bucket is introduced; and a second end connected to the pump, wherein the dehumidifier further comprising a weight installed on one end of the flexible tube to bend the flexible tube downward, wherein the weight is inserted into the bucket and pulls the first end of the tube toward an inner bottom surface of the bucket, wherein the weight is immersed in the condensed water within the bucket, wherein a fitting mount on which the barrier fitting is mounted is disposed on the barrier, and wherein a tube space is provided into which a portion of the barrier fitting protrudes and through which an outlet of the flexible tube is connected to the barrier fitting.

12. The dehumidifier according to claim 11, wherein an outer surface of the dehumidifier includes an outer through hole, though which the outer tube or the drain hose may pass.

* * * * *